United States Patent
Wang et al.

(10) Patent No.: US 9,430,060 B2
(45) Date of Patent: Aug. 30, 2016

(54) STYLUS CAPABLE OF DETECTING PRESSURE ON A TIP

(71) Applicant: Wistron Corporation, New Taipei (TW)

(72) Inventors: Kuo-Hsing Wang, New Taipei (TW); Pei-Chen Chin, New Taipei (TW); Pin-Hsien Su, New Taipei (TW); Wen-Chin Wu, New Taipei (TW); Yi-Sheng Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 38 days.

(21) Appl. No.: 13/661,027

(22) Filed: Oct. 25, 2012

(65) Prior Publication Data
US 2013/0257824 A1    Oct. 3, 2013

(30) Foreign Application Priority Data
Mar. 29, 2012    (TW) ............................... 101111139 A (51) Int. Cl.
*G06F 3/033*    (2013.01)
*G06F 3/0354*   (2013.01)
(Continued)

(52) U.S. Cl.
CPC ....... *G06F 3/03545* (2013.01); *G06F 3/03542* (2013.01); *G06F 3/042* (2013.01); *G06F 3/0414* (2013.01)

(58) Field of Classification Search
CPC .... G06F 3/041; G06F 3/042; G06F 3/03545; G06F 3/0414
USPC ........................................ 345/173, 175, 179
See application file for complete search history.

(56) References Cited

U.S. PATENT DOCUMENTS 5,357,062 A * 10/1994 Rockwell ............ G06F 3/03545
178/19.04
5,565,632 A    10/1996 Ogawa
(Continued)

FOREIGN PATENT DOCUMENTS

TW    200802104    1/2008
TW    201131434    9/2011

OTHER PUBLICATIONS

Office action mailed on Jun. 27, 2014 for the Taiwan application No. 101111139, filing date: Mar. 29, 2012, p. 1 line 9-14, p. 2-7 and p. 8 line 1-4.
(Continued)

*Primary Examiner* — Chanh Nguyen
*Assistant Examiner* — Yuzhen Shen
(74) *Attorney, Agent, or Firm* — Winston Hsu; Scott Margo (57) ABSTRACT

A stylus capable of detecting pressure on its tip is disclosed in the present disclosure. The stylus includes a holder, a tip and a pressure sensing module. The pressure sensing module can detect the pressure on the tip. The pressure sensing module includes a retractable body disposed inside the holder and connected to the tip. The retractable body includes a base, a reference component disposed on an end of the base and fixed inside the holder, and a movable component disposed on the other end of the base and connected to the tip. The movable component can move relative to the reference component with the tip. The pressure sensing module further includes a sensor disposed by the retractable body for detecting a movement of the movable component relative to the reference component, so that value of the movement can be analyzed for calculating value of the pressure.

13 Claims, 6 Drawing Sheets

(51) Int. Cl.
*G06F 3/042* (2006.01)
*G06F 3/041* (2006.01)

(56) References Cited

U.S. PATENT DOCUMENTS

| | | | |
|---|---|---|---|
| 5,977,959 A | 11/1999 | Katsurahira | |
| 6,556,149 B1* | 4/2003 | Reimer | H03K 17/9631 |
| | | | 250/227.21 |
| 7,528,825 B2* | 5/2009 | Sakurai et al. | 345/179 |
| 8,274,037 B2* | 9/2012 | Ritter et al. | 250/214.1 |
| 8,536,471 B2* | 9/2013 | Stern et al. | 178/19.04 |
| 8,648,839 B2 | 2/2014 | Liaw | |
| 8,727,557 B2 | 5/2014 | Yuan | |
| 2010/0051356 A1* | 3/2010 | Stern et al. | 178/19.04 |
| 2011/0043492 A1* | 2/2011 | Elsasser et al. | 345/179 |
| 2011/0128258 A1* | 6/2011 | Liang | G06F 3/03545 |
| | | | 345/180 |
| 2011/0169775 A1* | 7/2011 | Liaw et al. | 345/175 |
| 2011/0317878 A1* | 12/2011 | Kang et al. | 382/106 |
| 2013/0027358 A1 | 1/2013 | Liaw | |
| 2013/0100087 A1 | 4/2013 | Liaw | |
| 2013/0106802 A1 | 5/2013 | Liaw | |
| 2013/0188336 A1 | 7/2013 | Yuan | |

OTHER PUBLICATIONS

Office action mailed on Sep. 25, 2015 for the China application No. 201210104830.X, p. 3 line 4-44 and p. 4.

* cited by examiner

STYLUS CAPABLE OF DETECTING PRESSURE ON A TIP

BACKGROUND OF THE INVENTION

1. Field of the Invention

The present disclosure relates to a touch stylus, and more particularly, to a touch stylus for detecting a movement between a tip and a holder, so as to sense pressure on the tip.

2. Description of the Prior Art

Currently, in the market of various kinds of consumer electronic products, touch panels have been widely applied in portable electronic devices, such as personal digital assistants (PDA), mobile phones, and notebooks for serving as the interface of information communication tool between the users and the electronic devices. Since modern electronic products increasingly become smaller, thinner, and lighter, the display with a touch panel has gradually become the key component of various electronic products in order to save space and to replace conventional input apparatuses, such as keyboard and mouse, leaning on the trend of requirement of human-based designed flat computer.

For example, the portable electronic device has advantages of thin volume and large dimension screen for displaying the information, so the touch panel is usually utilized to be human-machine interface between the users and the portable electronic device. The touch panel can display patterns and characters, and further can be a touch input module. When the user presses the touch panel, the touch panel can detect a position of pressure, and output a control command according to the pressure position on a surface of the touch panel, so as to control the application program installed in the portable electronic device.

A conventional touch stylus includes a capacitive touch stylus and an electromagnetic touch stylus. The electromagnetic touch stylus includes an antenna to receive an electromagnetic signal, has drawbacks of inconvenient operation and expensive manufacturing cost. An electromagnetic coil is disposed inside a body of the electromagnetic touch stylus. When a tip of the touch stylus is pressed, the tip moves relative to the body, and a movement of the tip drives the electromagnetic coil to generate magnetic flux variation, so the electromagnetic touch stylus calculates the pressure on the tip according to the magnetic flux variation. Besides, the electromagnetic touch stylus can further obtain the pressure on the tip according to variation of capacitance value by compression. The capacitive touch stylus does not include an additional receiver, and is utilized to paint a writing track without recording the pressure variation. The tip of the capacitive touch stylus is huge, such as 5-6 mm, for accommodating capacitors and related components. The capacitive touch stylus is inconveniently to be held.

The conventional touch stylus further includes an optical touch stylus. The conventional optical touch stylus can not record pressure variation of the tip. The latest type optical touch stylus detects luminous flux to show the pressure variation of the tip, and has a drawback that detection is interfered easily by ambient light. An integration of the electromagnetic touch stylus, the capacitive touch stylus and the optical touch stylus can design a touch stylus has pressure detection function. Mechanical design and circuit design of the integration touch stylus is complicated that results in expensive manufacturing cost. Therefore, design of a low cost touch stylus without specific receiver for detecting pressure on the tip is an important issue in the computer industry.

SUMMARY OF THE INVENTION

The present disclosure provides a touch stylus for detecting a movement between a tip and a holder, so as to sense pressure on the tip for solving above drawbacks.

According to the claimed disclosure, a touch stylus capable of detecting pressure on its tip is disclosed. The touch stylus includes a holder, a tip and a pressure sensing module. The tip is movably disposed on an end of the holder. The pressure sensing module is disposed between the holder and the tip for sensing the pressure on the tip. The pressure sensing module includes a retractable body disposed inside the holder and connected to the tip. The retractable body includes a base, a reference component and a movable component. The reference component is disposed on an end of the base and fixed inside the holder. The movable component is disposed on the other end of the base and connected to the tip. The movable component moves relative to the reference component with the tip. The pressure sensing module further includes a sensor disposed by the retractable body for detecting a movement of the movable component relative to the reference component, so as to transform the movement into the pressure accordingly.

According to the claimed disclosure, the sensor includes an optical emitter and an optical receiver, and the optical emitter and the optical receiver are respectively disposed on the reference component and the movable component. The optical receiver receives an optical signal emitted from the optical emitter, and calculates the movement by analyzing a time transmission difference of the optical signal.

According to the claimed disclosure, the sensor includes an optical emitter, an optical receiver and a lens. The optical emitter and the optical receiver are respectively disposed on the reference component and the movable component, and the lens is disposed between the optical emitter and the optical receiver. The optical receiver receives an optical signal emitted from the optical emitter through the lens, and calculates the movement by analyzing an intensity of the optical signal.

According to the claimed disclosure, the sensor includes an optical emitter, an optical receiver and a fiber cable. Two openings of the fiber cable are disposed on the reference component, and a middle area of the fiber cable is disposed on the movable component. The optical emitter and the optical receiver are respectively disposed on the openings of the fiber cable. The optical receiver receives an optical signal emitted from the optical emitter through the fiber cable, and calculates the movement by analyzing a time transmission difference of the optical signal.

According to the claimed disclosure, the base is a retractably deformable structure.

According to the claimed disclosure, the sensor includes a sonic emitter and a sonic receiver, and the sonic emitter and the sonic receiver are respectively disposed on the reference component and the movable component. The sonic receiver receives a sonic signal emitted from the sonic emitter, and calculates the movement by analyzing a time transmission difference of the sonic signal.

According to the claimed disclosure, the sensor includes a sonic emitter, a sonic receiver and a resilient unit. The sonic emitter and the sonic receiver are respectively disposed on the reference component and the movable component, and the resilient unit is disposed inside the base. The sonic receiver receives a sonic signal emitted from the sonic emitter through the reference component and the movable component, and calculates the movement by analyzing an intensity of the sonic signal.

According to the claimed disclosure, the base is a retractably deformable airtight structure.

According to the claimed disclosure, the reference component and the movable component respectively are mesh structures.

According to the claimed disclosure, the resilient unit is resilient deformed when the movable component moves relative to the reference component, so as to block the mesh structure.

According to the claimed disclosure, the base is a retractably deformable airtight structure. The sensor includes a manometer disposed by a side of the base. The manometer detects a pressure variation of a medium disposed inside the base, and calculates the movement by analyzing the pressure variation.

According to the claimed disclosure, the medium is gas or liquid.

The touch stylus of the present disclosure discloses several embodiments to achieve aims of detecting the movement of the movable component relative to the reference component. The touch stylus of the present disclosure can calculate the pressure on the tip by analyzing the movement of the tip relative to the holder, so as to perform the width variation of the painting line. The pressure on the tip and the movement of the tip relative to the holder are in direct proportion, which means the pressure on the tip and the movement of the movable component relative to the reference component are in the same direct proportion. Therefore, the present disclosure can accurately detect tiny variation of the pressure on the tip, effectively prevent interference of the ambient electromagnetic signal, and have advantages of simple structure, easy assembly and low manufacturing cost.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
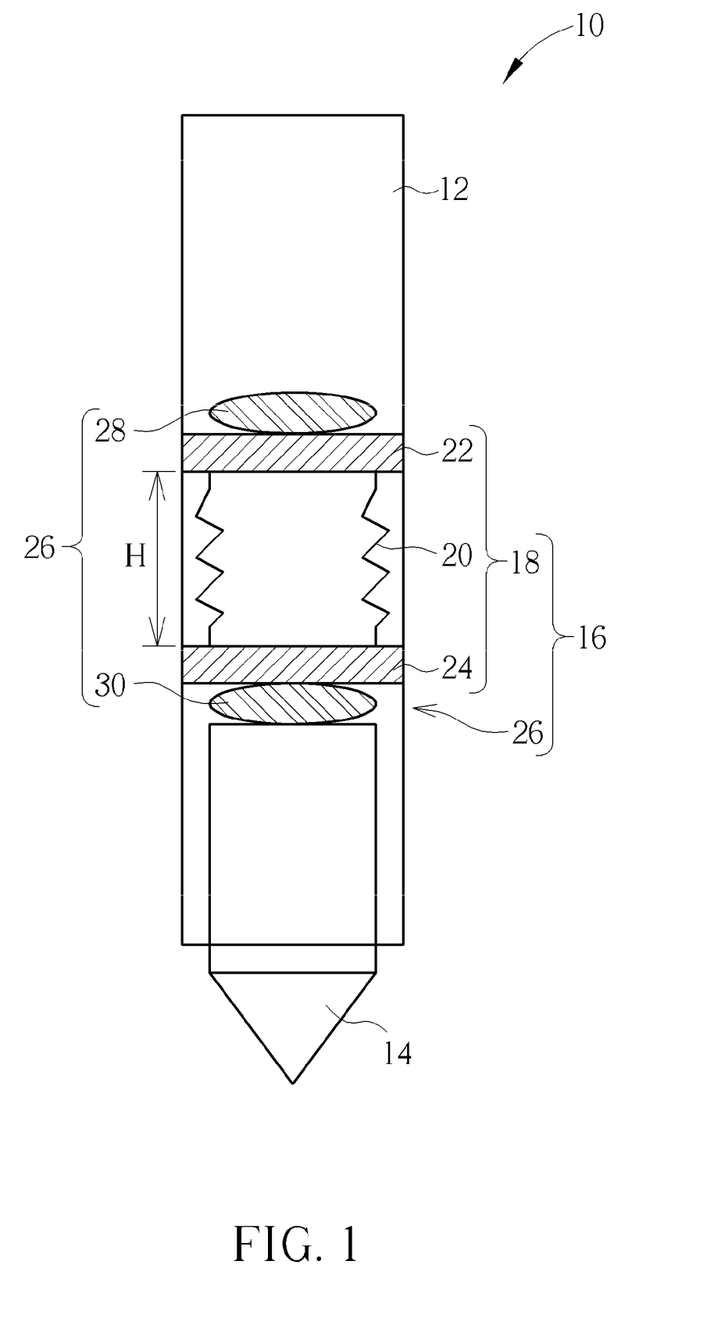
FIG. 1 is a diagram of a touch stylus according to a first embodiment of the present disclosure.

Please refer to FIG. 1. FIG. 1 is a diagram of a touch stylus 10 according to a first embodiment of the present disclosure. The touch stylus 10 includes a holder 12, a tip 14 and a pressure sensing module 16. The user can grasp the touch stylus 10 via the holder 12, and the holder 12 can be a tube structure. The tip 14 is movably disposed on an end of the holder 12. The pressure sensing module 16 is disposed between the holder 12 and the tip 14. When using the touch stylus 10 to paint a line, the tip 14 can move relative to the holder 12 according to an applying force on the touch stylus 10, then the pressure sensing module 16 can sense and transform a movement of the tip 14 relative to the holder 12 into the pressure on the tip 14, so as to analyze a width variation of the line.

As shown in FIG. 1, the pressure sensing module 16 includes a retractable body 18, which is disposed inside the holder 12 and connected to the tip 14. The retractable body 18 can include a base 20, a reference component 22 and a movable component 24. The base 20 has specific structural features in different embodiments, and detailed description is introduced as following. The reference component 22 and the movable component 24 are respectively disposed on two ends of the base 20. The reference component 22 is fixed on the holder 12 to be stable element, and the movable component 24 is connected to the tip 14. When the tip 14 moves relative to the holder 12, the retractable body 18 is compressed by the tip 14 to generate retractable deformation, which means the movable component 24 can move toward the reference component 22 with the tip 14, so as to reduce volume of the base 20. In addition, the pressure sensing module 16 further includes a sensor 26 disposed by a side of the retractable body 18. The sensor 26 can sense a movement H of the movable component 24 relative to the reference component 22, and generate an electrical signal according to the movement H. An external controller can read and transform the electrical signal into a value of the corresponding pressure on the tip 14, so as to perform the width variation of the line that is painted by the touch stylus 10.

In the first embodiment, the sensor 26 can include an optical emitter 28 and an optical receiver 30. The optical emitter 28 and the optical receiver 30 are respectively disposed on the reference component 22 and the movable component 24, and the optical receiver 30 can receive an optical signal emitted from the optical emitter 28. When using the touch stylus 10, the tip 14 can move relative to the holder 12 according to the applying force, which means the movement H of the movable component 24 relative to the reference component 22 is adjustable. After, the sensor 26 and the external controller can calculate the pressure on the tip 14 according to the movement H.

When the applying force on the tip 14 is large, the movable component 24 moves close to the reference component 22, the movement H becomes greater, and a time transmission difference of the optical signal from the optical emitter 28 to the optical receiver 30 is short. The optical receive 30 can generate the electrical signal according to the movement H, and transmit the electrical signal to the external controller for calculating the pressure on the tip 14, so as to perform the line with a broad width. Furthermore, the movement H of the movable component 24 relative to the reference component 22 becomes smaller when the applying force on the tip 14 is slight. The time transmission difference of the optical signal is extended due to a long optical path. The optical receiver 30 can detect the optical signal with the long time transmission difference, and generate the corresponding electrical signal, so that the external controller can transform the electrical signal into the pressure on the tip 14, to perform the line with a narrow width.

Figure 2:
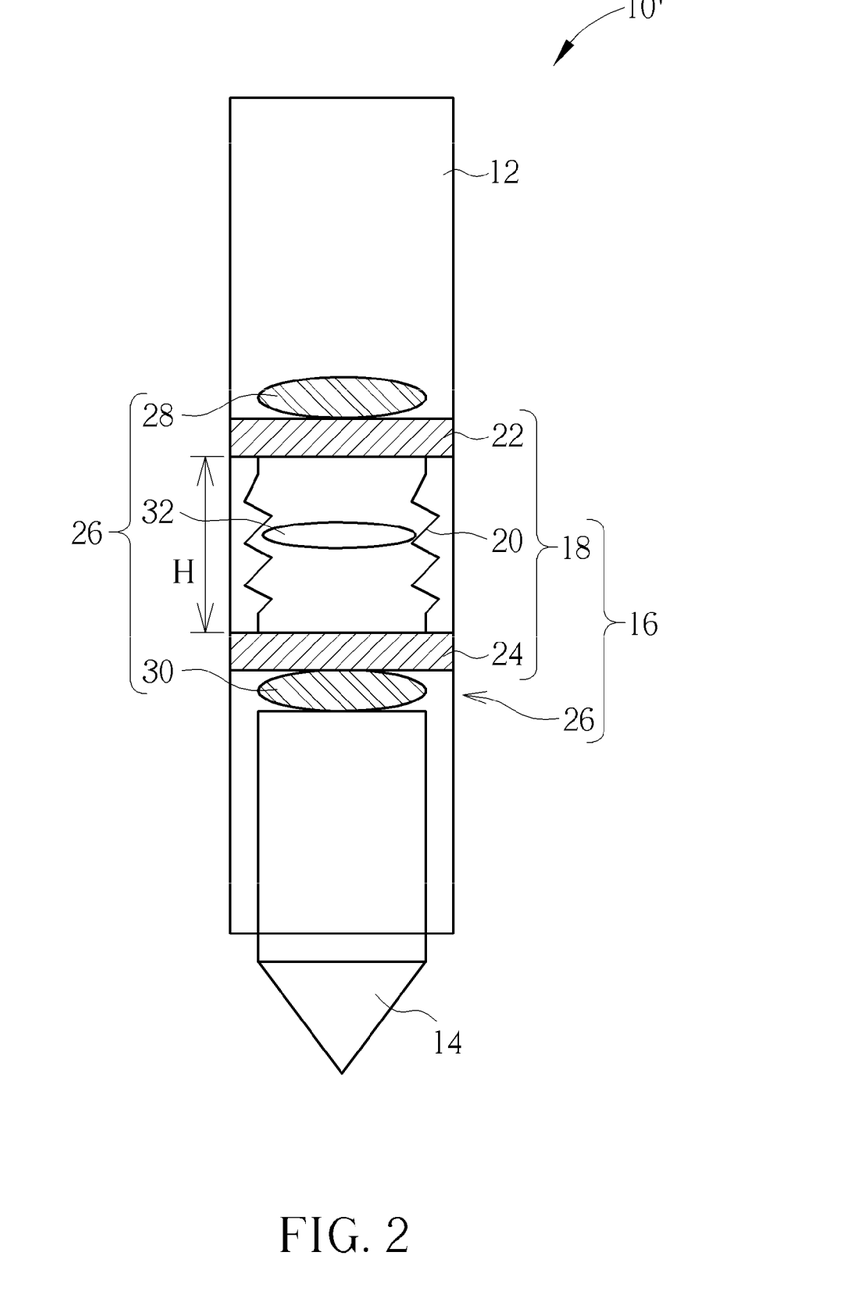
FIG. 2 is a diagram of a touch stylus according to a second embodiment of the present disclosure.

Please refer to FIG. 2. FIG. 2 is a diagram of a touch stylus 10' according to a second embodiment of the present disclosure. In the second embodiment, elements having the same numerals as ones of the first embodiment have the same structures and functions, and a detailed description is omitted herein for simplicity. Difference between the second embodiment and the first embodiment is that the sensor 26 can include the optical emitter 28, the optical receiver 30 and a lens 32. The lens 32 is disposed between the optical emitter 28 and the optical receiver 30. The optical signal emitted from the optical emitter 28 can pierce through the lens 32 to focus on the optical receiver 30. When the applying force on the tip 14 is large, the movement H of the movable component 24 relative to the reference component 22 becomes greater, and the optical signal is diverged from a focal point, so that the optical receiver 30 receives the weak optical signal.

On the contrary, the movement H of the movable component 24 relative to the reference component 22 becomes smaller when the pressure on the tip 14 is slight. The optical signal can focus on the focal point, and the optical receiver 30 can receive the strong optical signal. Therefore, the touch stylus 10' of the second embodiment can calculate the movement H according to intensity of the optical signal and generate the corresponding electrical signal, so the external controller can transform the electrical signal into the pressure on the tip 14, to analyze the width variation of the line painted by the touch stylus 10'.

Figure 3:
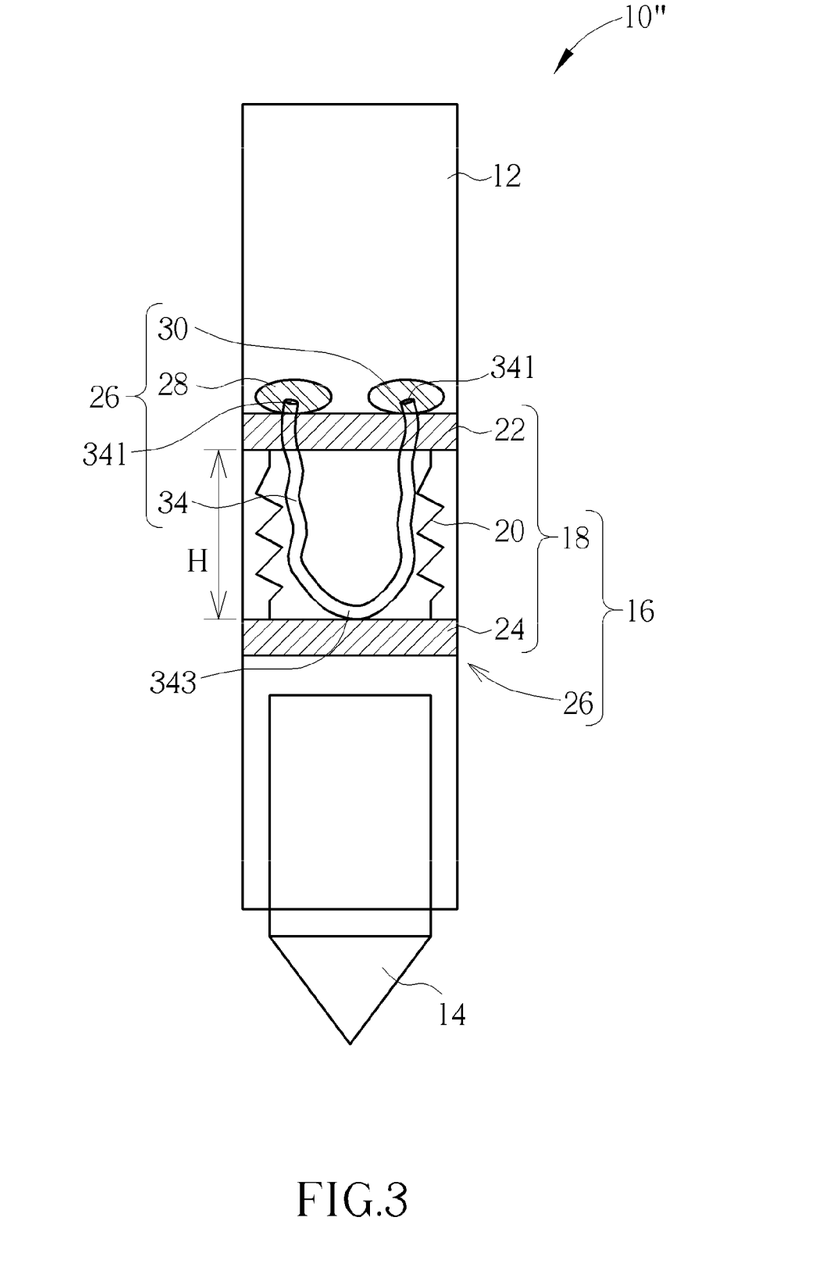
FIG. 3 is a diagram of a touch stylus according to a third embodiment of the present disclosure.

Please refer to FIG. 3. FIG. 3 is a diagram of a touch stylus 10" according to a third embodiment of the present disclosure. In the third embodiment, elements having the same numerals as ones of the above-mentioned embodiment have the same structures and functions, and a detailed description is omitted herein for simplicity. Difference between the third embodiment and the above-mentioned embodiment is that the sensor 26 can include the optical emitter 28, the optical receiver 30 and a retractable fiber cable 34. The retractable fiber cable 34 is disposed between the reference component 22 and the movable component 24, and a length of the retractable fiber cable 34 is adjustable according to the movement H of the movable component 24 relative to the reference component 22. The optical signal emitted from the optical emitter 28 can pass through the fiber cable 34 to be received by the optical receiver 30, and the fiber cable 34 can effectively prevent the optical signal from energy loss during transmission. Elements capable of transmitting the optical signal without the energy loss can be a substitute as the fiber cable 34, and the other application is omitted herein for simplicity.

As shown in FIG. 3, the fiber cable 34 can be disposed inside the retractable body 18. Two openings 341 of the fiber cable 34 are disposed on the reference component 22, and a middle area 343 of the fiber cable 34 is disposed on the movable component 24. The optical emitter 28 and the optical receiver 30 are respectively located on the openings 341. The retractable body 18 can be structurally deformed when the user applies force on the tip 14. When the applying force is large, the movement H of the movable component 24 relative to the reference component 22 becomes greater, the length of the fiber cable 34 is shortened, and the time transmission difference of the optical signal is decreased. On the contrary, the movement H of the movable component 24 relative to the reference component 22 becomes smaller when the applying force is slight. The length of the fiber cable 34 can be recovered to an initial long state, the time transmission difference of the optical signal wastes more periods. Thus, the optical receiver 30 of the touch stylus 10" of the third embodiment can calculate the movement H according to the time transmission difference of the optical signal, and generate the corresponding electrical signal, so that the external controller can transform the electrical signal into the pressure on the tip 14, to analyze the width variation of the line painted by the touch stylus 10".

In the first embodiment, the second embodiment and the third embodiment, the tip 14 moves relative to the holder 12 and drives the retractable body 18 into resilient deformation, so as to adjust the movement H of the movable component 24 relative to the reference component 22. The base 20 can be a retractably deformable structure, such as a rubber chamber or a foldable bellows. Volume of the retractably deformable base 20 can be reduced by the tip 14, so as to decrease a distance between the movable component 24 and the reference component 22. The distance represents the movement H. A resilient recovering force of the retractably deformable base 20 can be released when the applying force on the tip 14 is eliminated or weakened, so as to move the movable component 24 away from the reference 22 and to back the movable component 24 to an initial position. In this condition, the base 20 can be recovered to an original volume.

Figure 4:
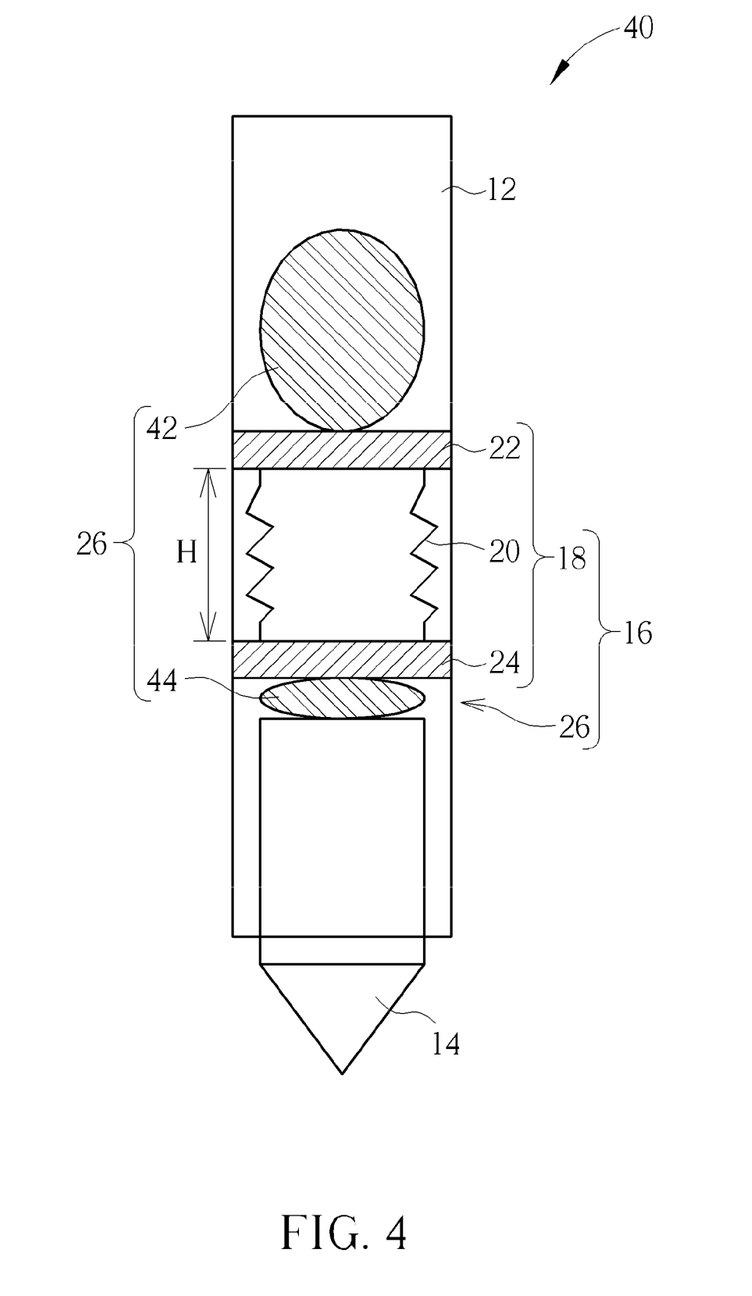
FIG. 4 is a diagram of a touch stylus according to a fourth embodiment of the present disclosure.

Please refer to FIG. 4. FIG. 4 is a diagram of a touch stylus 40 according to a fourth embodiment of the present disclosure. In the fourth embodiment, elements having the same numerals as ones of the above-mentioned embodiment have the same structures and functions, and a detailed description is omitted herein for simplicity. Difference between the fourth embodiment and the above-mentioned embodiment is that the sensor 26 of the touch stylus 40 can include a sonic emitter 42 and a sonic receiver 44. The sonic emitter 42 and the sonic receiver 44 are respectively disposed on the reference component 22 and the movable component 24, and the sonic receiver 44 is utilized to receive a sonic signal emitted from the sonic emitter 42.

When the applying force on the tip 14 is large, the movement H of the movable component 24 relative to the reference component 22 becomes greater, so that the sonic receiver 44 can receive the sonic signal emitted from the sonic emitter 42 immediately. On the contrary, the movable component 24 moves away from the reference component 22 when the applying force on the tip 14 is slight, and the movement H becomes smaller (comparing to the initial position of the movable component 24), so the sonic receiver 44 receives the sonic signal from the sonic emitter 42 with delay. The touch stylus 40 of the fourth embodiment can generate the electrical signal by analyzing the time transmission difference of the sonic signal, and the external controller can receive and transform the electrical signal into the corresponding pressure on the tip 14, so as to analyze the width variation of the line that is painted by the touch stylus 40.

It should be mentioned that the base 20 of the touch stylus 40 of the fourth embodiment is a retractably deformable airtight structure for preventing ambient noise interference. The reference component 22 and the movable component 24 can be mesh structures selectively, and the sonic signal can pierce through the mesh structure via its meshes. In detail, the sonic emitter 42 and the sonic receiver 44 are respectively disposed on two opposite surfaces of the retractable body 18. A plurality of meshes can be formed on the reference component 22 and the movable component 24 for sonic transmission, and the time transmission difference of the sonic signal may speed or delay according to retractable deformation of the base 20.

Figure 5:
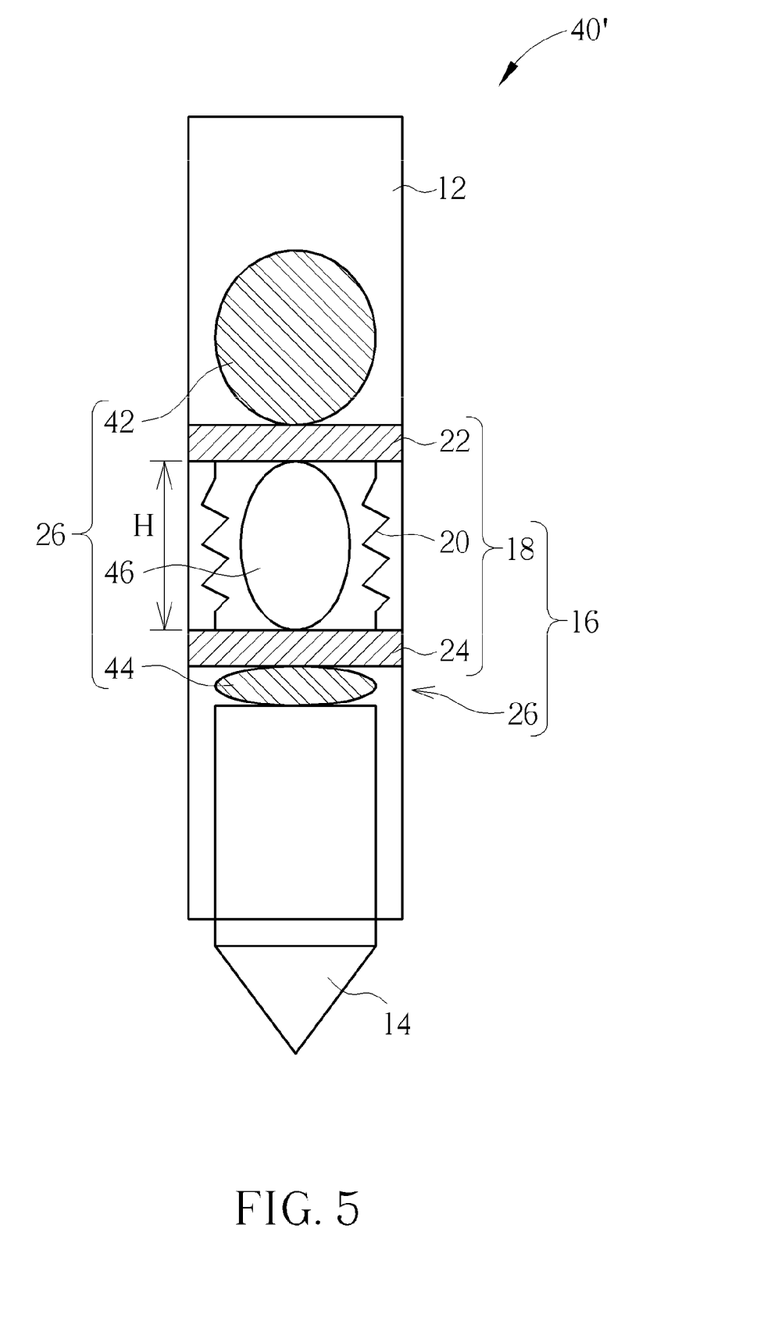
FIG. 5 is a diagram of a touch stylus according to a fifth embodiment of the present disclosure.

Please refer to FIG. 5. FIG. 5 is a diagram of a touch stylus 40' according to a fifth embodiment of the present disclosure. In the fifth embodiment, elements having the same numerals as ones of the above-mentioned embodiment have the same structures and functions, and a detailed description is omitted herein for simplicity. Difference between the fifth embodiment and the above-mentioned embodiment is that the sensor 26 of the touch stylus 40' includes the sonic emitter 42, the sonic receiver 44 and a resilient unit 46. The resilient unit 46 can be disposed inside the base 20, and be compressed or recovered according to the distance between the reference component 22 and the movable component 24. As shown in FIG. 5, the sonic signal emitted from the sonic emitter 42 can be transmitted to the sonic receiver 44 through the base 20. The movement H becomes greater when the applying force on the tip 14 is large. The resilient unit 46 can be compressed to be flat by the reference component 22 and the movable component 24, so as to cover the mesh structures and to block transmission fluency of the sonic signal. Thus, the sonic receiver 44 receives the sonic signal with weak intensity.

On the contrary, the movement H becomes smaller when the applying force on the tip 14 is slight, and the resilient unit 46 can be recovered to an initial state for exposing the mesh structures. Meanwhile, the sonic receiver 44 receives the sonic signal with strong intensity. It is to say, the touch stylus 40' of the fifth embodiment can utilize the compressive deformation of the resilient unit 46 to block the mesh structures, so as to adjust sonic penetration of the base 20. An amount of the blocking mesh structures is increased when the applying force on the tip is large, the retractable body 18 has low sonic penetration, and the sonic receiver 44 receives the weak sonic signal. An amount of the blocking mesh structures is decreased when the applying force on the tip is slight, the retractable body 18 has high sonic penetration, and the sonic receiver 44 receives the strong sonic signal. Therefore, the touch stylus 40' can generate the electrical signal according to the intensity of the sonic signal, and the external controller can calculate the pressure on the tip 14 by analyzing the electrical signal, so as to perform the width variation of the line painted by the touch stylus 40'.

Figure 6:
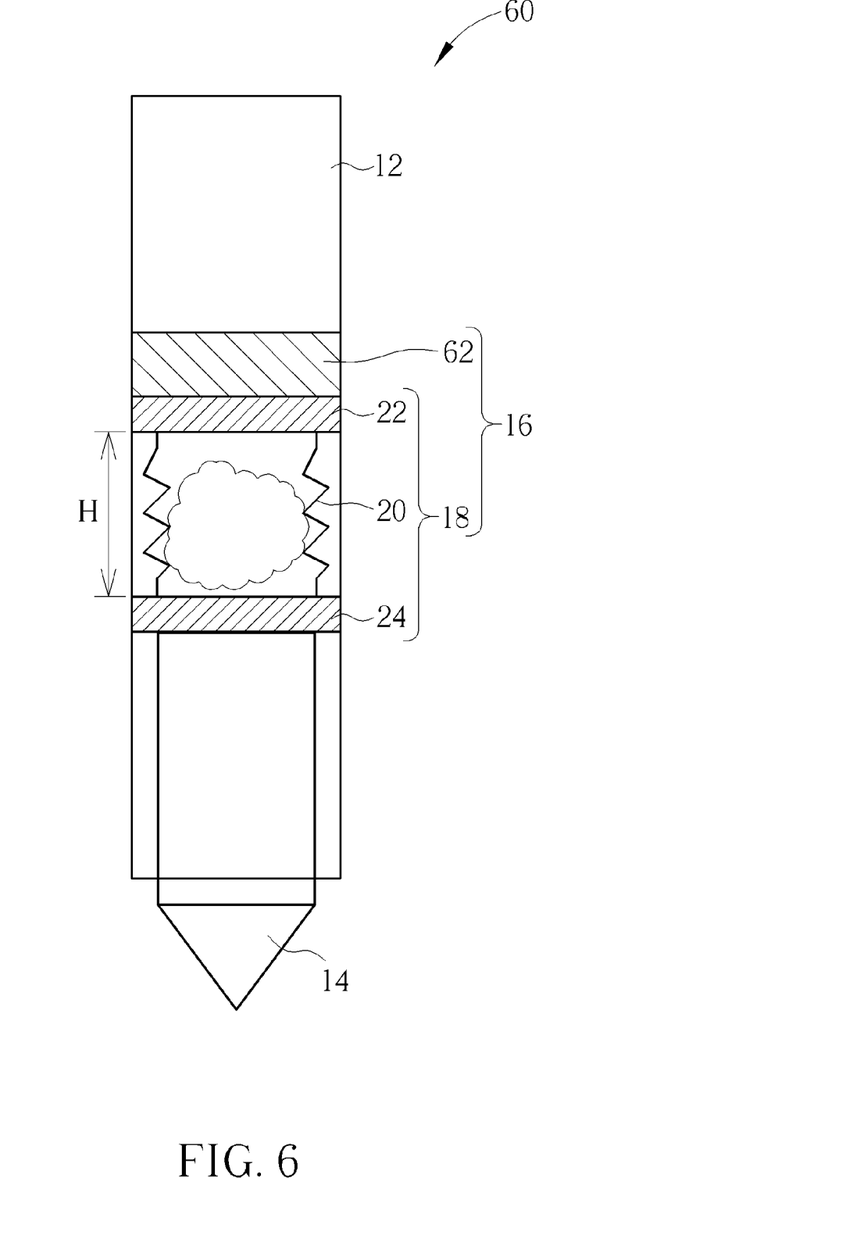
FIG. 6 is a diagram of a touch stylus according to sixth embodiment of the present disclosure.

Please refer to FIG. 6. FIG. 6 is a diagram of a touch stylus 60 according to sixth embodiment of the present disclosure. In the sixth embodiment, elements having the same numerals as ones of the above-mentioned embodiment have the same structures and functions, and a detailed description is omitted herein for simplicity. Difference between the sixth embodiment and the above-mentioned embodiment is that the base 20 of the touch stylus 60 can be a retractably deformable airtight structure, and the sensor 26 can include a manometer 62 disposed by a side of the base 20. A medium is disposed inside the base 20, and the medium can be gas or liquid. For example, the medium can be the liquid with low temperature sensitivity or the gas with inert chemical action preferably. Airtight design of the base 20 can effectively prevent the medium from leakage. When the tip 14 is pressed, the retractable body 18 can be deformed with the movement of the tip 14 relative to the holder 12, and pressure of the medium disposed inside the base 20 can be varied accordingly. The touch stylus 60 of the sixth embodiment can utilize the manometer 62 to sense pressure variation of the medium disposed inside the base 20 for generating the corresponding electrical signal, so that the external controller can transform the electrical signal into the corresponding pressure on the tip 14, to perform the width variation of the line painted by the touch stylus 60.

In conclusion, the touch stylus of the present disclosure utilizes the pressure sensing module to detect the movement of the tip relative to the holder, so as to calculate the pressure on the tip. The reference component of the retractable body of the pressure sensing module is fixed inside the holder, and the movable component can move relative to the reference component according to the applying force on the tip. The base of the retractable body has retractably deformable feature, so that the sensor of the pressure sensing module can detect the movement of the movable component relative to the reference component, which means the retractable deformation of the base, and the sensor can transform the movement into the pressure that the user applies on the tip. In the embodiment of the present disclosure, the pressure sensing module can utilize an optical detection method, a sonic detection method, an air pressure detection method or a liquid pressure detection method to calculate the structural deformation of the retractable body. The touch stylus of the present disclosure can transform information, which is detected by the optical detection method, the sonic detection method, the air pressure detection method or the liquid pressure detection method, into the corresponding electrical signal. The external controller can read the electrical signal to analyze the pressure on the tip, so as to perform the line with the width variation or to provide pressure data to the other electronic product.

Comparing to the prior art, the touch stylus of the present disclosure discloses several embodiments to achieve aims of detecting the movement of the movable component relative to the reference component. The touch stylus of the present disclosure can calculate the pressure on the tip by analyzing the movement of the tip relative to the holder, so as to perform the width variation of the painting line. The pressure on the tip and the movement of the tip relative to the holder are in direct proportion, which means the pressure on the tip and the movement of the movable component relative to the reference component are in the same direct proportion. Therefore, the present disclosure can accurately detect tiny variation of the pressure on the tip, effectively prevent interference of the ambient electromagnetic signal, and have advantages of simple structure, easy assembly and low manufacturing cost.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch stylus capable of detecting pressure on its tip, the touch stylus comprising:
   a holder;
   a tip movably disposed on an end of the holder; and
   a pressure sensing module disposed between the holder and the tip for sensing the pressure on the tip, the pressure sensing module comprising:
      a retractable body disposed inside the holder and connected to the tip, the retractable body comprising:
         a base, comprising a first end portion, a second end portion and a resilient tubular portion, two ends of the resilient tubular portion being integrally sealed by the first end portion and the second end portion;
         a reference component undetachably fixed to the first end portion of the base and fixed inside the holder; and
         a movable component undetachably fixed to the second end portion of the base and connected to the tip, an interval between the reference component and the movable component being inversely proportionally varied by elastic deformation of the resilient tubular portion; and
      a sensor comprising an emitter and a receiver respectively disposed on the reference component and the movable component, the base being a chamber disposed on a signal transmission path between the emitter and the receiver, and the receiver receiving a signal emitted from the emitter and only passing through the resilient tubular portion, and detecting a movement of the movable component relative to the reference component based on a time transmission difference of the signal, so as to transform the movement into the pressure accordingly.

2. The touch stylus of claim 1, wherein the emitter is an optical emitter and the receiver is an optical receiver.

3. The touch stylus of claim 2, wherein the optical emitter and the optical receiver are respectively disposed on the reference component and the movable component.

4. The touch stylus of claim 3, wherein the optical receiver receives an optical signal emitted from the optical emitter, and calculates the movement by analyzing a time transmission difference of the optical signal.

5. The touch stylus of claim 4, wherein a lens is disposed between the optical emitter and the optical receiver, the optical receiver receives an optical signal emitted from the optical emitter through the lens, and calculates the movement by analyzing an intensity of the optical signal.

6. The touch stylus of claim 1, wherein the emitter is an optical emitter, the receiver is an optical receiver, and the sensor further comprises a fiber cable.

7. The touch stylus of claim 1, wherein the reference component and the movable component respectively are mesh structures.

8. The touch stylus of claim 7, wherein the sensor comprises a sonic emitter and a sonic receiver.

9. The touch stylus of claim 8, wherein the sonic emitter and the sonic receiver are respectively disposed on the reference component and the movable component, the sonic receiver receives a sonic signal emitted from the sonic emitter, and calculates the movement by analyzing a time transmission difference of the sonic signal.

10. The touch stylus of claim 1, wherein the base is a retractably deformable airtight structure.

11. The touch stylus of claim 10, wherein the sensor comprises a sonic emitter, a sonic receiver and a resilient unit.

12. The touch stylus of claim 11, wherein the sonic emitter and the sonic receiver are respectively disposed on the reference component and the movable component, the resilient unit is disposed inside the base, the sonic receiver receives a sonic signal emitted from the sonic emitter through the reference component and the movable component, and calculates the movement by analyzing an intensity of the sonic signal.

13. The touch stylus of claim 12, wherein the resilient unit is resilient deformed when the movable component moves relative to the reference component, so as to block the mesh structure.

* * * * *